Patented Apr. 13, 1948

2,439,669

UNITED STATES PATENT OFFICE 2,439,669

CHLORINATED METHYLPOLYSILOXANE RESINS

Birger W. Nordlander, Schenectady, N. Y., assignor to General Electric Company, a corporation of New York No Drawing. Application May 5, 1945, Serial No. 592,292

6 Claims. (Cl. 260—46.5)

The present invention relates to chlorinated methylpolysiloxane resins. It is particularly concerned with the production of chlorinated methylpolysiloxane resins, cured films of which are more flexible, tougher, and more craze-resistant than cured films of the corresponding untreated polysiloxane resins. A more specific embodiment of the invention is the process of improving the craze-resistance of a heat-hardenable methylpolysiloxane resin obtained by cohydrolysis and cocondensation of a mixture of chlorosilanes consisting of about 0.56 mol per cent dimethyldichlorosilane, about 0.27 mol per cent methyltrichlorosilane and about 0.17 mol per cent silicon tetrachloride, which process comprises forming a carbon tetrachloride solution of said resin, subjecting the resulting solution to ultraviolet radiations, and passing chlorine into said solution at reflux temperatures until the increase in weight of the solution indicates that the chlorine content of the resin is from 0.2 to 0.4 chlorine atom per methyl group; and the product of such a process.

Methylpolysiloxane or silicone resins of the type with which the present invention is concerned are described and claimed in Patent 2,258,218 of Eugene G. Rochow. Specific resins of this type obtained by cohydrolysis and cocondensation of one or more methylhalogenosilanes and a silicon tetrahalide are described and claimed in the copending application Serial No. 393,843, filed May 16, 1941 now abandoned in the name of Eugene G. Rochow and assigned to the same assignee as the present invention. The resinous polysiloxanes contain an average of at least one and less than two methyl groups per silicon atom. The preferred resins are those containing an average of appproximately 1.3 to approximately 1.7 methyl groups per silicon atom. As compared with the wholly organic plastic materials, these silicone resins are outstanding in their heat resistance. However, when they are heated at elevated temperatures in the neighborhood of 275 to 300 degrees C., particularly in the form of thin films, the resins tend to craze or crack and become more brittle.

The present invention is based on the discovery that by passing chlorine into a heated solution of a soluble polysiloxane resin having a methyl-to-silicon ratio within the range given hereinbefore, chlorinated products can be obobtained which in the cured or heat-hardened state are more flexible, tougher, and have a greater heat resistance than the corresponding unchlorinated resins.

The chlorination of the soluble heat-hardenable methylpolysiloxane resins is preferably effected by dissolving the polysiloxanes in a suitable inert solvent such as carbon tetrachloride and passing chlorine into the resultant solution employing ultraviolet radiations to promote the chlorination reaction and to maintain the reaction mass at reflux temperatures. In order to obtain resins having the improved properties enumerated hereinbefore, it has been found desirable to continue the introduction of chlorine into the solution until the resin has taken up an average of from about 0.2 to 0.4 atom of chlorine per methyl group.

In order that those skilled in the art better may understand how the present invention can be carried into effect, the following specific examples are given:

Example 1

The polysiloxane resin employed in this example had a methyl-to-silicon ratio of about 1.4 and was obtained by cohydrolysis and cocondensation of a mixture of chlorosilanes consisting of about 0.54 mol fraction dimethyldichlorosilane, 0.33 mol fraction methyltrichlorosilane, and 0.13 mol fraction silicon tetrachloride. 100 parts of this soluble heat-hardenable polysiloxane resin was dissolved in 500 parts carbon tetrachloride and placed in a flask provided with a stirrer, a reflux condenser open to the air and a mercury quartz lamp as a source of ultraviolet radiations. Chlorine gas was passed into the solution which was maintained at reflux temperatures by the heat of reaction and the ultraviolet radiations. The reaction was allowed to proceed for 15 minutes, at the end of which time the chlorine-to-methyl ratio of the chlorinated product was approximately 0.2. The solution was then evaporated until practically all of the solvent had been removed. Pieces of desized glass fiber tape were dipped into the resultant material and the remaining solvent removed by air drying.

At the same time, pieces of the same glass fiber tape were coated with the corresponding unchlorinated resin. It was observed that the chlorinated products deposited thicker films than the untreated polysiloxanes, indicating that the resin had also undergone some form of change similar to that obtained by treating solutions of polysiloxane resins with hydrated ferric chloride or the like as described in the copending application of James G. E. Wright and James Marsden, Serial No. 455,615, filed August 21, 1942, now Patent No. 2,389,477, issued November 20, 1945, and assigned to the same assignee as the present invention. The air-dried films were cured for 2 minutes at 300 degrees C. and then subjected to a temperature of 275 degrees C. Whereas the unchlorinated product became brittle and crazed in less than 5 hours heating at 275 degrees C., the chlorinated material was quite flexible and showed no signs of crazing on being heated for 24 hours at this temperature. After 120 hours at 275 degrees C. the films of the chlorinated material showed signs of beginning to craze but were still flexible.

When a mixture of chlorosilanes in the molar proportion of 0.56 mol per cent dimethyldichlorosilane, 0.27 mol per cent methyltrichlorosilane, and 0.17 mol per cent silicon tetrachloride were employed in the same manner as in Example 1, there was obtained, on chlorination of the resinous hydrolysis product, a resin whose craze-resistance was equivalent to that of the resin prepared in Example 1 above.

Example 2

Example 1 was repeated except that a solution of 200 parts of the methyl polysiloxane resin in 500 parts of carbon tetrachloride was employed. The solution was treated with chlorine at reflux temperatures until the chlorine content of the resinous product amounted to about 0.2 atom chlorine per methyl group. The resinous product was applied to glass tapes in the same manner as in Example 1, and the cured films were then heated at 275 degrees C. After 18 hours at this temperature the resin films were still flexible, showed no signs of crazing, and had a dielectric strength of about 650 volts per mil. After heating for 48 hours the dielectric strength was 450 volts per mil, there being no apparent change in the physical properties of the resin. After about 168 hours heating the resin films were still flexible, although crazed in spots and the dielectric strength had dropped to 100 volts per mil.

Example 3

Employing the same apparatus and polysiloxane solution described in Example 1, chlorine was passed into the polysiloxane solution at reflux temperatures for 30 minutes. At the end of this time the increase in weight showed that the chlorine-to-methyl ratio of the product was about 0.4. Films of the cured resin on glass fiber tape were almost as flexible as films of the chlorinated resin of Example 1, and showed no signs of crazing and still remained flexible after being heated for 20 hours at 275 degrees.

Example 4

The methyl polysiloxane resin employed in this example was obtained by hydrolysis and condensation of a mixture of 10 per cent by weight of silicon tetrachloride and 90 per cent by weight of an unfractionated mixture of methyl chlorosilanes obtained by passing methyl chloride over a heated copper-silicon mass as described and claimed in the copending application Serial No. 412,459, filed September 26, 1941, in the name of Eugene G. Rochow, now Patent No. 2,380,995, issued August 7, 1945, and assigned to the same assignee as this present invention. This unfractionated mixture consisted essentially of a mixture of methyltrichlorosilane and dimethyldichlorosilane and a small amount of trimethylchlorosilane in such proportions that the hydrolysis product had a methyl-to-silicon ratio between 1 and 2. 100 parts of the resinous hydrolysis and condensation product was dissolved in 500 parts carbon tetrachloride and chlorinated by the procedure described in Example 1 for 85 minutes. The chlorine content of the product was about 0.6 atom chlorine per methyl group.

While the films of the treated resin on glass fiber tape were somewhat less flexible than those obtained in Examples 1, 2 and 3, they were superior in this respect to the films obtained from the unchlorinated resin. When aged at 275 degrees C., the films of the treated resin began to craze after about 8 hours heating.

Example 5

Example 4 was repeated with the exception that the time of chlorination was extended to 180 minutes. The chlorine content of the product obtained was estimated to be equal to 1.4 atoms of chlorine per methyl group. Films of the cured product on glass fiber tape were hard and brittle. When heated at 275 degrees C., crazing appeared in less than 5 hours.

Further evidence that there is a fundamental change in the character of the resins when chlorinated by the process of the present invention is found in the results of the following tests. When the unchlorinated resin employed in Examples 1–3 was heated with a small amount of aluminum trichloride at 205 degrees C., it cured rapidly to form a somewhat short, cheesy film. On the other hand, when the treated resinous product of Example 1 having a Cl/CH3 ratio of 0.2 was heated in the same way with aluminum chloride, it cured much more slowly and the final product was a tough, somewhat rubbery polymer. The same results were obtained when ferric chloride was substituted for the aluminum chloride.

From the results given hereinbefore, it will be observed that the present invention provides a means of obtaining polysiloxane resins of improved flexibility and heat-resistance. For best results, the chlorine treatment should be such that the chlorine-to-methyl ratio of the product is from about 0.2 to 0.4.

While the invention has been described with reference to a specific polysiloxane or silicone resin, it is to be understood that the invention is applicable to any methylpolysiloxane resin having a methyl-to-silicon ratio greater than 1 and less than 2, preferably from 1.3 to 1.7 methyl groups per silicon atoms, to obtain chlorinated resins of improved flexibility and heat-resistance. Examples of such resins are found in the above-mentioned Rochow patent and copending application.

What I claim as new and desire to secure by Letters Patent of the United States is:

1. The process of improving the craze-resistance of a methylpolysiloxane resin which comprises passing chlorine into a solution of a methylpolysiloxane resin having a methyl-to-silicon ratio greater than 1 and less than 2 in an inert solvent and at reflux temperatures until the chlorine-to-methyl ratio of the chlorinated resin is between 0.2 and 0.4 the said passage of chlorine taking place under the effect of ultraviolet radiations.

2. The chlorinated methylpolysiloxane resinous product of claim 1.

3. The process which comprises forming a solution of a methylpolysiloxane resin having a methyl-to-silicon ratio between 1.3 to 1.7 in an inert solvent and passing chlorine into the solution under the effect of ultraviolet radiations until the chlorine-to-methyl ratio of the chlorinated resin is between 0.2 and 0.4.

4. The chlorinated methylpolysiloxane resinous product of the process of claim 3.

5. The process of improving the craze-resistance of a heat-hardenable methylpolysiloxane resin obtained by cohydrolysis and condensation of a mixture of chlorosilanes consisting of 0.56 mol per cent dimethyldichlorosilane, 0.27 mol per cent methyltrichlorosilane and 0.17 mol per cent silicon tetrachloride, which process comprises forming a carbon tetrachloride solution of said resin, subjecting said solution to ultraviolet radiations while simultaneously passing chlorine into said solution at reflux temperatures until the increase in weight of the solution indicates that the chlorine content of the resin is from 0.2 to 0.4 chlorine atom per methyl group.

6. The chlorinated resinous product of claim 5.

BIRGER W. NORDLANDER.

REFERENCES CITED

The following references are of record in the file of this patent:

UNITED STATES PATENTS

| Number | Name | Date |
| --- | --- | --- |
| 2,258,219 | Rochow | Oct. 7, 1941 |
| 2,384,384 | McGregor et al. | Sept. 4, 1945 |